United States Patent [19]

Serizawa et al.

[11] Patent Number: 5,242,959
[45] Date of Patent: Sep. 7, 1993

[54] POLYARYLENE SULFIDE RESIN COMPOSITION HAVING EXCELLENT ADHESION AND PROCESS FOR THE PREPARATION OF SAME

[75] Inventors: Hagime Serizawa, Mishima; Masaru Kubota, Fujinomiya, both of Japan

[73] Assignee: Polyplastics Co., Ltd., Osaka, Japan

[21] Appl. No.: 808,727

[22] Filed: Dec. 17, 1991

[30] Foreign Application Priority Data

Dec. 17, 1990 [JP] Japan ................... 2-402708

[51] Int. Cl.⁵ ............................... C08K 5/15
[52] U.S. Cl. ..................... 524/114; 524/609; 525/537
[58] Field of Search ............... 524/609, 114; 525/537

[56] References Cited

U.S. PATENT DOCUMENTS

| | | | |
|---|---|---|---|
| 4,528,346 | 7/1985 | Sugie et al. | 525/523 |
| 4,748,169 | 5/1988 | Izutsu et al. | 524/500 |
| 5,002,983 | 3/1991 | Nakata et al. | 525/537 |
| 5,008,342 | 4/1991 | Phadke | 525/286 |

FOREIGN PATENT DOCUMENTS 0360544  3/1990  European Pat. Off.
59-207921  11/1984  Japan.

Primary Examiner—John C. Bleutge
Assistant Examiner—Mark Sweet
Attorney, Agent, or Firm—Depaoli & O'Brien

[57] ABSTRACT

A polyarylene sulfide resin composition having improved adhesion comprises (A) 100 parts by weight of a polyarylene sulfide resin, (B) 0.1 to 15 parts by weight of a compound having a carbon-carbon double bond and an epoxy group in its molecule and, if necessary, (C) a radical initiator and (D) a filler.

18 Claims, No Drawings

POLYARYLENE SULFIDE RESIN COMPOSITION HAVING EXCELLENT ADHESION AND PROCESS FOR THE PREPARATION OF SAME

BACKGROUND OF THE INVENTION

The present invention relates to a polyarylene sulfide (PAS) resin composition having improved adhesion and a process for the preparation of the same.

More particularly, the present invention relates to a polyarylene sulfide resin composition which has excellent adhesion to an adhesive and is prepared by blending a polyarylene sulfide resin with a compound having a carbon-carbon double bond and an epoxy group in its molecule and, if necessary, a radical initiator and a filler.

Recently thermoplastic resins which have high heat resistance and chemical resistance and excellent flame retardance have been demanded as the materials of construction for components of electrical or electronic appliances, automobile parts, chemical instruments or for other functional parts.

A polyarylene sulfide resin represented by polyphenylene sulfide is one of the resins satisfying this demand. Inasmuch as polyarylene sulfide is inexpensive relative to the physical properties thereof, the demand for polyarylene sulfide resin has increased.

Although polyarylene sulfide resin has excellent chemical resistance, heat resistance, flame retardance and mechanical strengths, it has a disadvantage of having poor adhesion to an adhesive or a coating, so that an article constituted of moldings of polyarylene sulfide resin adhesive-bonded to each other is liable to separation of the moldings from each other or that an applied coating to a molded article of the polyarylene sulfide resin is liable to peel off. Accordingly, the application of polyarylene sulfide resin to fields requiring such laminated or coated resin is limited. Although the addition of a PAS compatible hydrophilic graft or block copolymer to a polyarylene sulfide resin has been proposed as a means for improving the adhesion of a coating or the like to a molded article of the PAS resin (see Japanese Patent Laid-Open No. 200166/1986), adhesion is still insufficient, so that a further improvement in adhesion is needed.

SUMMARY OF THE INVENTION

Accordingly, an object of the present invention is to improve the adhesion of a polyarylene sulfide resin. The inventors have found that a PAS molding material which has excellent adhesion and has practical application can be prepared by blending a polyarylene sulfide resin with a compound having an epoxy group and a carbon-carbon double bond in the compound molecule and, if necessary, a radical initiator, and melt-kneading the obtained mixture.

DETAILED DESCRIPTION OF THE INVENTION

Specifically, the present invention relates to a polyarylene sulfide resin composition having excellent adhesion and which is prepared by blending (A) 100 parts by weight of a polyarylene sulfide resin with (B) 0.1 to 15 parts by weight of a compound having a carbon-carbon double bond and an epoxy group in its molecule, (C) 0 to 20% by weight based on the component (B) of a radical initiator and (D) 0 to 400 parts by weight of one or more fillers selected from among fibrous, powdery and flaky ones, and a process for the preparation of a polyarylene sulfide resin, characterized by kneading a mixture comprising at least components (A), (B) and, if necessary, (C) under heat melting for at least 30 seconds.

The polyarylene sulfide resin to be used in the present invention as the component (A) is one mainly constituted of repeating units represented by the formula: $-\!\!\!+\!\text{Ar}-\text{S}\!+\!\!\!-$ (wherein Ar is an arylene group).

Examples of the arylene group include p-phenylene, m-phenylene, o-phenylene and substituted phenylene groups (wherein the substituent is an alkyl group preferably having 1 to 5 carbon atoms or a phenyl group), p,p'-diphenylene sulfone, p,p'-biphenylene, p,p'-diphenylene ether, p,p'-diphenylene-carbonyl and naphthalene groups.

Although an arylene sulfide homopolymer constituted of the same repeating units among the arylene sulfide groups described above may be used in the present invention, the use of a copolymer constituted of a plurality of repeating units different from each other is preferable in some cases with respect to the processability of the resulting composition.

In particular, a substantially linear homopolymer composed of p-phenylene sulfide repeating units is preferably used.

The copolymer to be used in the present invention may be any one constituted of two or more repeating units different from each other selected from among the arylene sulfide units mentioned above. Particularly, a copolymer comprising p-phenylene sulfide units as a major component together with m-phenylene sulfide units is preferably used. More particularly, it is suitable with respect to heat resistance, moldability, mechanical characteristics and so on to use a substantially linear copolymer comprising at least 60 mole %, still preferably at least 70 mole % of p-phenylene sulfide units. Further, it is preferable that the copolymer contain 5 to 40 mole %, still preferably 10 to 25 mole % of m-phenylene sulfide units.

Among such copolymers, a block copolymer (for example, one disclosed in Japanese patent Laid-Open No. 14228/1986) is preferred to a random one, because the former is superior to the latter in processability, heat resistance and mechanical properties.

Although the polyarylene sulfide resin to be used in the present invention as the component (A) may be either a relatively low-molecular weight linear polymer or a polymer having improved processability during molding by crosslinking such a relatively low-molecular weight linear polymer oxidatively or thermally to increase its melt viscosity, the polyarylene sulfide resin may also be a substantially linear high-molecular weight polymer prepared by the polycondensation of a monomer component mainly comprising a difunctional monomer. In many cases, the latter linear polymer is superior to the former with respect to the physical properties of the resulting molded article.

Further, a crosslinked polyarylene sulfide resin prepared from a monomer having at least three functional groups as a part of the monomer component or a blend of the above linear polymer with such a crosslinked polyarylene sulfide resin as well as the polymers described above can be suitably used in the present invention.

The present invention is characterized by adding to the PAS resin a compound having a carbon-carbon double bond and an epoxy group in the compound molecule, for example, an epoxidized vinyl or allyl compound as the component (B). The compound having a carbon-carbon double bond and an epoxy group is preferably a monomeric compound having a boiling point of at least 150° C., still preferably at least 200° C. so as not to evaporate away during the melt kneading. Examples of the compound include allyl glycidyl ether, glycidyl acrylate, glycidyl methacrylate, glycidyl vinylbenzoate, glycidyl allylbenzoate, N-[4-(2,3-epoxypropoxy)-3,5-dimethylbenzyl]acrylamide, glycidyl cinnamate, glycidyl cinnamylideneacetate, chalcone glycidyl ether, N-diallylaminoepoxypropane, epoxyhexene, diglycidyl esters of dimer acids and acrylate and methacrylate of epoxidized stearyl alcohol, and mixtures of two or more thereof.

The component (B) is used in an amount of 0.1 to 15 parts by weight, preferably 1 to 10 parts by weight per 100 parts by weight of the polyarylene sulfide resin component (A). The amount of the component (B) to be added varies depending upon the kind of the component (B) and the application field of the resulting composition. If the amount is too small, the adhesion will hardly be improved, while if the amount is too large, the composition will result in difficulties during molding and processing or will result in bleedout owing to a high melt viscosity.

Although the radical initiator (C) is not necessarily an essential component in the composition of the present invention, the addition thereof is preferable for improving the adhesion of the composition. Although the radical initiator (C) may be any one selected from among azo and peroxide initiators, it is suitable to use a radical initiator having a relatively high decomposition temperature, i.e., one having a one-minute half-life temperature of 130° C. or above, preferably 150° C. or above. Although the radical initiator preferred from this standpoint varies depending upon the kind of component (B) and melt-kneading temperature, it generally includes 2,5-dimethylhexane-2,5-dihydroperoxide, di-t-butylperoxide, t-butyl cumyl peroxide, 2,5-dimethyl-2,5-di(t-butylperoxy)hexane, 2,5-dimethyl-2,5-di(t-butylperoxy)hexyne-3, 2,3-dimethyl-2,3-diphenylbutane, 2,3-diethyl-2,3-diphenylbutane, 2,3-dimethyl-2,3-di(p-methylphenyl)butane and 2,3-dimethyl-2,3-di(bromophenyl)butane.

The radical initiator (C) is used in an amount of 0 to 20% by weight based on the amount of component (B). It is preferable in order to improve the adhesion that the amount be 0.1 to 10% by weight. Although the amount of the radical initiator to be added varies depending upon the kind of the initiator and the application field of the resulting composition, the use thereof in too large an amount is unfavorable because the resulting composition will expand during melt molding.

Although the filler (D) is also not necessarily an essential component in the composition of the present invention, the use thereof is preferable for producing a molded article which has excellent mechanical strengths, heat resistance, dimensional stability, electrical properties and other performances. The filler (D) may be selected from among fibrous, powdery and flaky ones.

The fibrous filler includes inorganic fibrous materials, for example, glass fiber, asbestos fiber, carbon fiber, silica fiber, silica/alumina fiber, zirconia fiber, boron nitride fiber, silicon nitride fiber, boron fiber and potassium titanate fiber, and fibers of metals such as stainless steel, aluminum, titanium, copper or brass. Among them, glass fiber and carbon fiber are most representative. Further, the fibrous filler includes high-melting organic fibrous materials, for example, polyamides, fluororesins and acrylic resins.

The powdery filler includes carbon black, silica, quartz powder, glass bead, glass powder, silicates such as calcium silicate, aluminum silicate, kaolin, talc, clay, diatomaceous earth and wollastonite; metal oxides such as iron oxide, titanium oxide and alumina; metal carbonates such as calcium carbonate and magnesium carbonate; metal sulfates such as calcium sulfate and barium sulfate; silicon carbide, silicon nitride, boron nitride and various metal powders.

The flaky filler includes mica, glass flake and various metal foils.

These inorganic fillers may be used alone or as a mixture of two or more thereof. The simultaneous use of a fibrous filler, particularly glass or carbon fiber with a powdery or flaky filler is particularly effective in producing an article which has excellent mechanical strengths, dimensional accuracy and electrical properties.

The amount of the inorganic filler is at most 400 parts by weight per 100 parts by weight of the resin (A). If the amount exceeds 400 parts by weight, the resulting composition will have poor processability during molding and poor toughness. The use thereof in an amount of 250 parts by weight or below is particularly preferable.

Although the composition of the present invention can be prepared by various known processes, a mixture comprising at least the components (A), (B) and, if desired, (C) must be heat-melted and kneaded for at least 30 seconds. The component (D) and other components may be added either in this heat melting-kneading step together with the above components or in other steps. For example, the composition can be prepared by homogeneously mixing the components (A), (B), (C) and (D) together with a mixing machine such as a tumbler or Henschel mixer and melt-kneading the obtained mixture with a single- or twin-screw extruder to obtain pellets. In this preparation, it is preferable to employ a process which comprises preliminarily preparing a solution of the components (B) and (C), adding this solution to the component (A) of a powdery state, drying the obtained mixture, and subjecting the resulting mixture to the above melt-kneading. This process is particularly effective in homogeneously dispersing the component (C) which is used in a small amount according to the present invention to further improve the adhesion. The component (D) may be added either in the course of the above melt-kneading or thereafter.

The melt-kneading is conducted at a temperature higher than the melting point of the resin component by 5° to 100° C., preferably 10° to 60° C. The melt-kneading at too high a temperature causes unfavorable decomposition and abnormal reactions. Although the melt-kneading time varies depending upon the kneading temperature or the kind or amount of the component (B) or (C), it is 30 seconds to 15 minutes, preferably 1 to 10 minutes.

Although a detailed mechanism of how the adhesion of a polyarylene sulfide resin is improved according to the present invention has not been sufficiently elucidated, it is inferred that the polyarylene sulfide resin is bonded to the compound (B) by the action of the radical initiator to thereby improve the adhesion.

The composition of the present invention may further contain conventional additives so far as the use thereof does not deviate from the objects of the present invention and examples thereof include antioxidant, heat stabilizer, lubricant, nucleating agent, ultraviolet absorber, coloring agent, mold release agent and so forth. Further, a small amount of another thermoplastic resin may be added to the composition as an auxiliary component. These additives may be added either during the melt kneading described above or in some other step.

As described above, the polyarylene sulfide resin composition of the present invention has remarkably improved adhesion to an adhesive, particularly an epoxy adhesive without exerting any adverse effect on the mechanical characteristics and appearance of a molded article formed of the composition.

EXAMPLES

The present invention will now be described in more detail by referring to the following Examples, although the invention is not to be construed or limited by them.

EXAMPLES 1 TO 8 AND COMPARATIVE EXAMPLES 1 AND 2

3 parts by weight of N-(4-(2,3-epoxypropoxy)-3,5-dimethylbenzyl)acrylamide (AXE) and a preliminarily prepared 10% acetone solution of 2,3-dimethyl-2,3-diphenylbutane (R-1) were added to 10 parts by weight of a polyphenylene sulfide polymer (PPS) (m.p.: 285° C., viscosity: 500 P as determined at 310° C. and a shear rate of 1200 sec$^{-1}$). The acetone was removed from the obtained mixture, followed by the addition of a glass fiber (chopped strand having a diameter of 10 μm and a length of 3 mm). The obtained mixture was premixed in a Henschel mixer for 5 minutes and melt-kneaded with an extruder at a cylinder temperature of 310° C. (residence time: about 2 minutes) to give pellets of a polyarylene sulfide resin composition having a formulation specified in Table 1.

The pellets were molded into a test piece for the ASTM tensile test with an injection molding machine at a cylinder temperature of 310° C. and a mold temperature of 150° C. This piece was subjected to the tensile test and an adhesion test. The adhesive strength was determined by the following method.

The test piece for the ASTM tensile test was cut into halves. Both halves were sufficiently washed with acetone and bonded to each other with an epoxy adhesive (a product of Konishi K.K., Konishi bond E 30H) with an overlap length of 8 mm. The bonded test piece was treated at 120° C. for one hour to cure the adhesive and allowed to stand in an atmosphere at 23° C. and 50% humidity for one day. Thereafter, the test piece was subjected to the tensile test and examined for adhesive strength under shear.

The results ar given in Table 1.

TABLE 1

| | | Comp. Ex. 1 | Ex. 1 | Ex. 2 | Ex. 3 | Ex. 4 | Comp. Ex. 2 | Ex. 5 | Ex. 6 | Ex. 7 | Ex. 8 |
|---|---|---|---|---|---|---|---|---|---|---|---|
| Formulation (pts. by wt.) | component (A) polyphenylene sulfide resin | 100 | 100 | 100 | 100 | 100 | 100 | 100 | 100 | 100 | 100 |
| | component (B) AXE | — | 3 | 3 | 3 | 3 | — | 3 | 3 | 3 | 3 |
| | component (C) R-1 (% by wt. based on the component (B)) | — | — | 0.5 | 1.0 | 10.0 | — | — | 0.5 | 1.0 | 10.0 |
| | component (D) glass fiber | — | — | — | — | — | 67 | 67 | 67 | 67 | 67 |
| Physical properties of the composition | adhesive strength under shear [kg/cm$^2$] | 25 | 37 | 43 | 46 | 50 | 32 | 42 | 45 | 51 | 56 |
| | tensile strength [kg/cm$^2$] | 650 | 650 | 650 | 650 | 660 | 1700 | 1710 | 1710 | 1710 | 1710 |
| | tensile elongation [%] | 1.9 | 1.8 | 1.9 | 1.9 | 2.0 | 1.4 | 1.4 | 1.4 | 1.5 | 1.5 |

EXAMPLES 9 TO 13

The same procedure as that of each of the foregoing Examples was repeated except that the PPS polymer, AXE and R-1 were used in a ratio specified in Table 2. The results are given in Table 2.

TABLE 2

| | | Comp. Ex. 1 | Ex. 9 | Ex. 10 | Ex. 2 | Ex. 11 | Comp. Ex. 2 | Ex. 12 | Ex. 13 |
|---|---|---|---|---|---|---|---|---|---|
| Formulation (pts. by wt.) | component (A) polyphenylene sulfide resin | 100 | 100 | 100 | 100 | 100 | 100 | 100 | 100 |
| | component (B) AXE | — | 0.5 | 1 | 3 | 10 | — | 10 | 10 |
| | component (C) R-1 (% by wt. based on the component (B)) | — | 0.5 | 0.5 | 0.5 | 0.5 | — | — | 0.5 |
| | component (D) glass fiber | — | — | — | — | — | 67 | 67 | 67 |
| Physical properties of the composition | adhesive strength under shear [kg/cm$^2$] | 25 | 31 | 36 | 43 | 55 | 32 | 50 | 61 |
| | tensile strength | 650 | 650 | 650 | 650 | 670 | 1700 | 1710 | 1710 |

TABLE 2-continued

|  | Comp. Ex. 1 | Ex. 9 | Ex. 10 | Ex. 2 | Ex. 11 | Comp. Ex. 2 | Ex. 12 | Ex. 13 |
| --- | --- | --- | --- | --- | --- | --- | --- | --- |
| [kg/cm$^2$] tensile elongation [%] | 1.9 | 1.9 | 1.8 | 1.9 | 2.1 | 1.4 | 1.5 | 1.5 |

EXAMPLES 14 TO 19

The same procedure as that of the foregoing Example was repeated except that the "R-1" used as the component (C) was replaced by 2,5-dimethyl-2,5-di(t-butyl-peroxy)hexyne-3 (R-2), 2,5-dimethyl-2,5-di(t-butyl-peroxy)hexane (R-3) or 2,5-dimethylhexane 2,5-dihydroperoxide (R-4).

The results are given in Table 3.

TABLE 3

| Formulation (pts. by wt.) | | | Comp. Ex. 1 | Ex. 14 | Ex. 15 | Ex. 16 | Comp. Ex. 2 | Ex. 17 | Ex. 18 | Ex. 19 |
| --- | --- | --- | --- | --- | --- | --- | --- | --- | --- | --- |
| | component (A) polyphenylene sulfide resin | | 100 | 100 | 100 | 100 | 100 | 100 | 100 | 100 |
| | component (B) AXE | | — | 3 | 3 | 3 | — | 3 | 3 | 3 |
| | component (C) (% by wt. based on the component (B)) | R-2 | — | 0.5 | — | — | — | 0.5 | — | — |
| | | R-3 | — | — | 0.5 | — | — | — | 0.5 | — |
| | | R-4 | — | — | — | 0.5 | — | — | — | 0.5 |
| | component (D) glass fiber | | — | — | — | — | 67 | 67 | 67 | 67 |
| Physical properties of the composition | adhesive strength under shear [kg/cm$^2$] | | 25 | 40 | 38 | 37 | 32 | 43 | 41 | 39 |
| | tensile strength [kg/cm$^2$] | | 650 | 650 | 660 | 640 | 1700 | 1700 | 1710 | 1690 |
| | tensile elongation [%] | | 1.9 | 1.8 | 1.8 | 1.9 | 1.4 | 1.4 | 1.3 | 1.4 |

EXAMPLES 20 TO 25

The same procedure as that of each of the foregoing Examples was repeated except that glycidyl methacrylate or N-diallylaminoepoxypropane was used as the component (B) instead of the "AXE" at a ratio specified in Table 4.

The results are given in Table 4.

TABLE 4

| Formulation (pts. by wt.) | | Comp. Ex. 1 | Ex. 20 | Ex. 21 | Ex. 22 | Ex. 23 | Comp. Ex. 2 | Ex. 24 | Ex. 25 |
| --- | --- | --- | --- | --- | --- | --- | --- | --- | --- |
| | component (A) polyphenylene sulfide resin | 100 | 100 | 100 | 100 | 100 | 100 | 100 | 100 |
| | component (B) | | | | | | | | |
| | glycidyl methacrylate | — | 3 | 3 | — | — | — | 3 | — |
| | n-diallyamino-epoxypropane | — | — | — | 3 | 3 | — | — | 3 |
| | component (C) R-1 (% by wt. based on the component (B)) | — | — | 0.5 | — | 0.5 | — | 0.5 | 0.5 |
| | component (D) glass fiber | — | — | — | — | — | 67 | 67 | 67 |
| Physical properties of the composition | adhesive strength under shear [kg/cm$^2$] | 25 | 35 | 38 | 36 | 41 | 32 | 42 | 44 |
| | tensile strength [kg/cm$^2$] | 650 | 640 | 650 | 650 | 660 | 1700 | 1700 | 1710 |
| | tensile elongation [%] | 1.9 | 1.9 | 1.8 | 2.0 | 2.1 | 1.4 | 1.5 | 1.5 |

What is claimed is:

1. A polyarylene sulfide resin composition obtained by melt-kneading
   (A) 100 parts by weight of a polyarylene sulfide resin with
   (B) 0.1 to 15 parts by weight of N-[4-(2,3-epoxypropoxy)-3,5-dimethylbenzyl]acrylamide
   (C) 0 to 20% by weight based on the component (B) of a radical initiator and
   (D) 0 to 400 parts by weight of one or more fillers selected from among fibrous, powdery and flaky ones.

2. A polyarylene sulfide resin composition as set forth in claim 1 wherein said radical initiator as component (C) has a one-minute half-life temperature of 130° C. or above.

3. A polyarylene sulfide resin composition as set forth in claim 2 wherein said radical initiator as component (C) has a one-minute half-life temperature of 150° C. or above.

4. A polyarylene sulfide resin composition as set forth in claim 1 wherein said polyarylene sulfide resin (A) is a homopolymer.

5. A polyarylene sulfide resin composition as set forth in claim 1 wherein said polyarylene sulfide resin (A) is polyphenylene sulfide.

6. A polyarylene sulfide resin composition as set forth in claim 5 wherein said polyarylene sulfide resin (A) is a homopolymer of p-phenylene sulfide units.

7. A polyarylene sulfide resin composition as set forth in claim 5 wherein said polyarylene sulfide resin (A) is a copolymer comprising p-phenylene sulfide units and m-phenylene sulfide units.

8. A polyarylene sulfide resin composition as set forth in claim 7 wherein said polyarylene sulfide resin (A) comprises 60–95 mole percent p-phenylene sulfide units and 5–40 mole percent m-phenylene sulfide units.

9. A polyarylene sulfide resin composition obtained by melt-kneading
   (A) 100 parts by weight of a polyarylene sulfide resin with
   (B) 0.1 to 15 parts by weight of N-diallyl-aminoepoxypropane
   (C) 0 to 20% by weight based on the component (B) of a radical initiator and
   (D) 0 to 400 parts by weight of one or more fillers selected from among fibrous, powdery and flaky ones.

10. A polyarylene sulfide resin composition as set forth in claim 9 wherein said radical initiator as component (C) has a one-minute half-life temperature of 130° C. or above.

11. A polyarylene sulfide resin composition as set forth in claim 10 wherein said radical initiator as component (C) has a one-minute half-life temperature of 150° C. or above.

12. A polyarylene sulfide resin composition as set forth in claim 9 wherein said polyarylene sulfide resin (A) is a homopolymer.

13. A polyarylene sulfide resin composition as set forth in claim 9 wherein said polyarylene sulfide resin (A) is polyarylene sulfide.

14. A polyarylene sulfide resin composition as set forth in claim 13 wherein said polyarylene sulfide resin (A) is a homopolymer of p-phenylene sulfide units.

15. A polyarylene sulfide resin composition as set forth in claim 13 wherein said polyarylene sulfide resin (A) is a copolymer comprising p-phenylene sulfide units and m-phenylene sulfide units.

16. A polyarylene sulfide resin composition as set forth in claim 15 wherein said polyarylene sulfide resin (A) comprises 60–95 mole percent p-phenylene sulfide units and 5–40 mole percent m-phenylene sulfide units.

17. The polyarylene sulfide resin composition as set forth in claim 9 containing 0.1 to 10% by weight of radical initiator (C) based on the amount of component (B).

18. The polyarylene sulfide resin composition as set forth in claim 1 containing 0.1 to 10% by weight of radical initiator (C) based on the amount of component (B).

* * * * *